United States Patent [19]
Shelton

[11] 4,091,942
[45] May 30, 1978

[54] POWER ASSISTED HAND TRUCK

[76] Inventor: James A. Shelton, 1208 E. 56th St., Tacoma, Wash. 98404

[21] Appl. No.: 761,194

[22] Filed: Jan. 21, 1977

[51] Int. Cl.² ............................................. B60P 1/18
[52] U.S. Cl. .................................. 214/148; 214/370; 280/47.2; 254/3 R
[58] Field of Search ............. 214/1 D, 130 R, 131 R, 214/146.5, 148, 370, 672, 673, 674; 187/9 R, 10; 280/47.2, 43.16; 254/3 R, 3 B, 3 C

[56] References Cited
U.S. PATENT DOCUMENTS

| | | | |
|---|---|---|---|
| 1,431,862 | 10/1922 | Allebrand et al. | 254/3 R X |
| 1,887,134 | 11/1932 | Johancen et al. | 254/3 R X |
| 2,320,601 | 6/1943 | Howell | 214/674 |
| 3,071,270 | 1/1963 | Baker | 214/674 |
| 3,191,786 | 6/1965 | Langrell | 214/1 D X |
| 3,540,753 | 11/1970 | Hanson | 254/3 R X |

*Primary Examiner*—L. J. Paperner
*Attorney, Agent, or Firm*—Townsend and Townsend

[57] ABSTRACT

A power assisted hand truck is disclosed. The hand truck includes a generally vertically extending rack pivotably mounted on a pair of laterally disposed front wheels and having a load bearing member extending from the front side thereof. A frame is connected to the front wheels and extends rearwardly with respect to the rack. The length of the frame in the rearward direction is adjustable, and the frame includes rear wheels on the underside thereof spaced from the front wheels. A bottom actuator is fixed to the frame and mounted so as to control the length thereof. A top actuator extends from the frame to the rack. The bottom and top actuators are operated to project the lower end of the rack forwardly and tilt the rack backwardly to lift a load resting on the load bearing member for transportation with the hand truck. The actuators are operated in reverse to lower the load.

7 Claims, 4 Drawing Figures

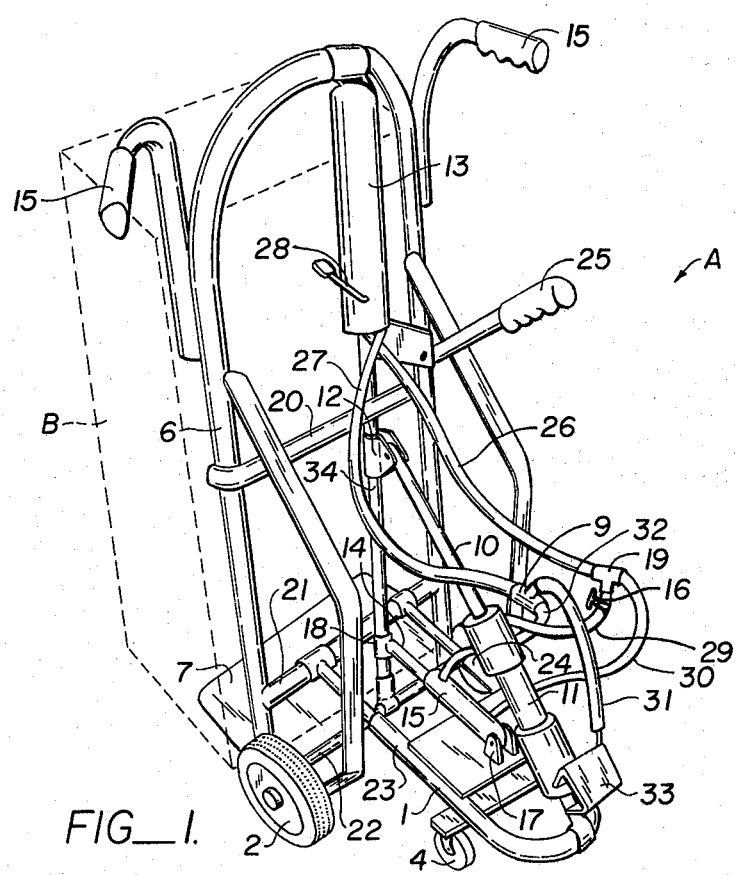
FIG__1.
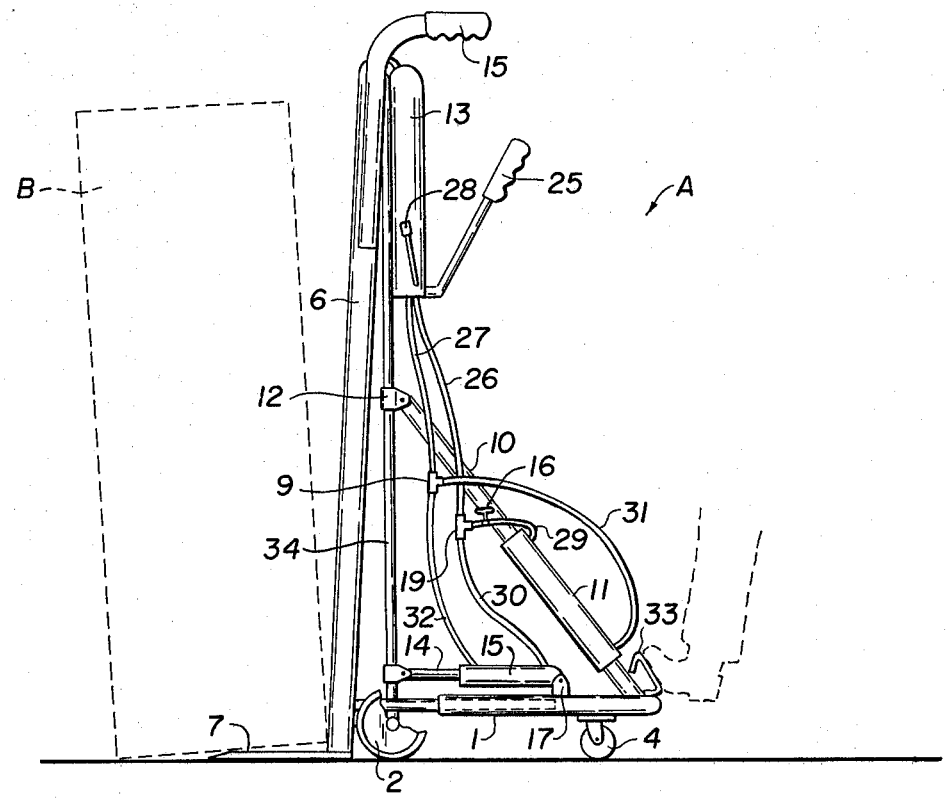
FIG__2A.

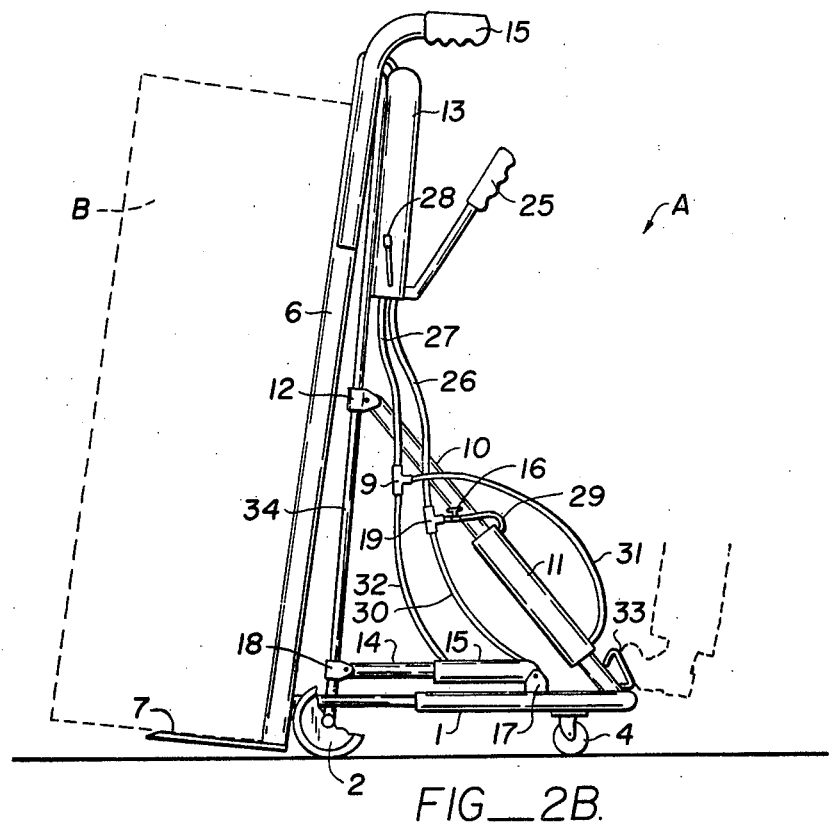
FIG_2B.
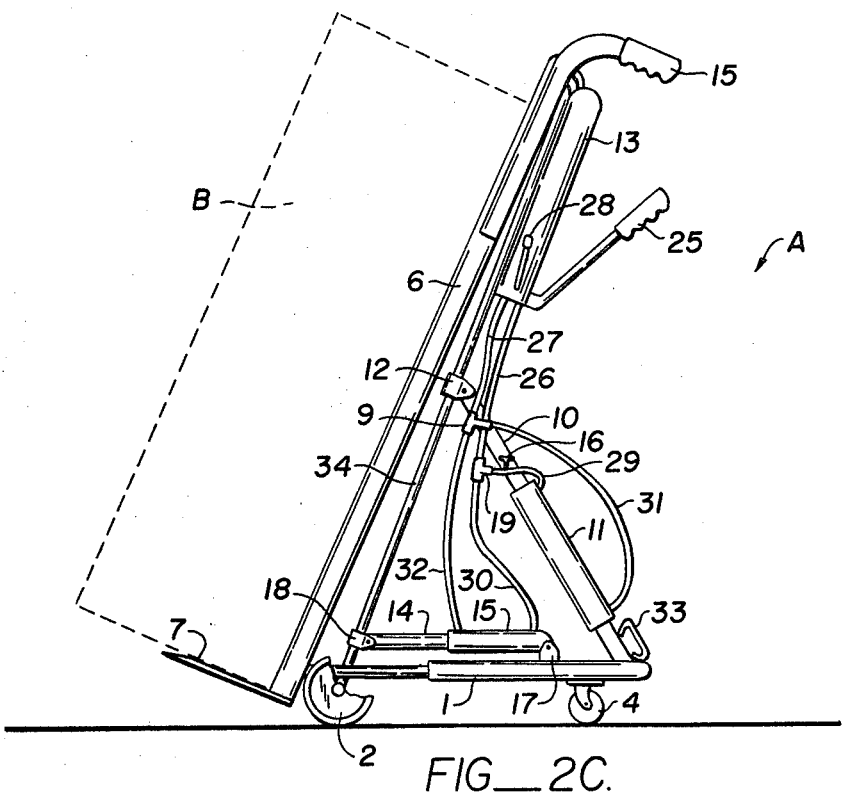
FIG_2C.

POWER ASSISTED HAND TRUCK

BACKGROUND OF THE INVENTION

The present invention provides a hand truck having a power assist to lift and lower the load to be carried.

Hand trucks are often used to carry loads which are too heavy or bulky to be readily carried by hand. Such hand trucks normally include a vertical rack, a load bearing horizontal member at the bottom of the rack, and wheels pivotably mounted to the bottom of the rack. The horizontal member can be slid under a load which is tilted forward, and the load is then tilted backwardly against the rack and the rack itself is pivoted backwardly to lift the load so that it can easily be transported.

Though quite useful, such hand trucks are difficult to operate with relatively heavy loads because of the force needed to tilt the rack backwardly to lift the load. Also, after lifting a heavy load, the hand truck is difficult to keep stable during transportation of the load because the rack is freely pivotable about the only wheels provided. As a result, heavy loads usually require participation of two or more persons operating the hand truck. If the load is too heavy to be carried even in this manner, a fork lift or other device must be used to transport the load.

A variety of different types of power assisted hand trucks have been developed in an attempt to facilitate the carrying of heavy loads. Examples of such hand trucks are contained in the following U.S. Pat. Nos. 2,078,217; 2,197,587; 2,415,655; 3,052,323; 3,182,835; and 3,698,736. However, all of these devices have been found to be either too complex or inefficient for the use intended, and none of these devices has achieved common acceptance.

SUMMARY OF THE INVENTION

The present invention provides a power assisted hand truck for use with heavy loads which is efficient, reliable and easy to operate. The hand truck includes a generally vertically extending rack pivotably mounted on a pair of laterally disposed front wheels and having a load bearing member extending from the front side thereof. A frame is connected to the front wheels and extends rearwardly with respect to the rack. The length of the frame in the rearward direction is adjustable, and the frame includes rear wheels on the under side thereof spaced from the front wheels. A bottom actuator is fixed to the frame and mounted so as to control the length thereof. A top actuator extends from the frame to the rack. The bottom and top actuators are operated to project the lower end of the rack forwardly and tilt the rack backwardly to lift a load resting on the load bearing member for transportation with the hand truck. The actuators are operated in reverse to lower the load.

In the preferred embodiment of the present invention, the actuators comprise hydraulic actuators, which are driven by a hand operated hydraulic pump attached to the rack. A throttling valve is interposed in the line from the hydraulic pump to the top actuator which limits the flow of hydraulic fluid to the top actuator during the initial raising of the load. The bottom actuator is thus fully extended prior to full or even partial retraction of the top actuator to lift the load.

The hand truck of the present invention provides a simple and effective mechanism for lifting and transporting relatively large loads. The combined action of the two actuators which both push the bottom of the load forwardly while tilting it backwardly allow the lifting of relatively heavy loads with little strain. The hand pump used is extremely reliable and relatively inexpensive, rendering the hand truck of the present invention more feasible than those described in the patents enumerated hereinabove, particularly those requiring motors to lift the load. The hand truck sllows for the lifting and transportation of heavy loads by a single employee without an external source of motive power.

The novel features which are characteristic of the invention, as to organization and method of operation, together with further objects and advantages thereof will be better understood from the following description considered in connection with the accompanied drawings which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the hand truck of the present invention;

FIG. 2A-C comprise a sequence of side elevation schematic views illustrating the operation of the hand truck of the present invention.

DESCRIPTION OF THE PREFERRED EMBODIMENT

The hand truck A of the present invention is illustrated generally by way of reference to FIG. 1. The hand truck has a generally vertical rack 6 which includes upstanding tubular portions connected by cross pieces 20, 21 and a centerpiece 34. A horizontal plate 7 is mounted to the lower end of rack 6 and extends forwardly with respect to the rack. Rack 6 is mounted to an axle 22 connecting front wheels 2. A generally horizontal frame 1 is mounted to cross piece 21 of rack 6. Frame 1 includes a pair of telescoping members 23, 24 extending rearwardly with respect to rack 6. Rear wheels 4 are mounted on the underside of horizontal frame 1.

A first hydraulic actuator 11 (called the top actuator) extends from the rear of horizontal frame 1 to a bracket 12 on the centerpiece 24 of rack 6. A second hydraulic actuator 15 (called the bottom actuator) extends from a bracket 17 on the rear portion of frame 1 to a second bracket 18 connected to centerpiece 24 of frame 6 near the lower end thereof.

A hydraulic pump 13 actuated by a hand lever 25 is mounted near the top of rack 6. A pair of hydraulic lines 26, 27 emanate from the lower end of hydraulic pump 13. One of the hydraulic lines 26, 27 comprises the output line of the pump, and the other line provides the input line. A lever 28 on pump 13 is used to select which line 26, 27 is used for output and input respectively.

Hydraulic line 26 is provided with a "T" fitting 19 which divides the line into a first branch 29 leading to the contraction side of actuator 11 and a second branch 30 to the expansion side of bottom actuator 15. Line 27 also splits at a "T" fitting 9 into a first branch 31 leading to the expansion side of top actuator 11 and a second branch 32 leading to the contraction of bottom actuator 15. A pressure valve 16 which acts as a throttling mechanism is located intermediate branch 29 to control the flow of hydraulic fluid to the contraction side of top actuator 11.

The operation of the present invention can perhaps best be illustrated by way of reference to FIGS. 2A–C in combination. In FIG. 2A, hand truck A is illustrated prior to lifting up a heavy load B. In FIG. 2B, load B has been lifted off the floor but is not yet ready for transporting. In FIG. 2C, load B has been lifted further and is now ready to be transported.

In FIG. 2A, top actuator 11 is extended to at or near its full length. On the other hand, bottom actuator 15 is contracted to the full extent possible. In this configuration, horizontal plate 7 is located either on the floor or very near thereto. By tilting load B slightly forwardly, and propelling hand truck A forwardly by pushing against footpad 33, plate 7 can be slipped under the load.

With load B on plate 7, control lever 28 on hand pump 13 is set so that line 26 becomes the output line and line 27 becomes the input line. Handle 25 is then reciprocated by hand so that hydraulic fluid is forced outwardly through line 26 and drawn inwardly through line 27.

During the initial lifting of load B, as illustrated by the transition between FIGS. 2A and 2B, pressure control valve 16 is either closed or nearly so that hand pump 13 initially forces most or all of the hydraulic fluid through branch 30 to expand actuator 15. Pressure is maintained on footpad 33 so that hand truck A cannot move rearwardly, and as a result, the bottom of rack 6 is propelled forwardly by the shaft 14 emanating from actuator 15. Since little or no hydraulic fluid is flowing to the contraction side of actuator 11, the position of shaft 10 emanating therefrom is substantially unchanged. However, because of the expansion of actuator 15, load B is pivoted slightly backwardly, and the combination of the forward thrust at the bottom and the backward pivoting lifts load B from the floor to the position illustrated in FIG. 2B in which bottom actuator 15 is fully extended.

With certain load configurations, it may be desirable to extend the bottom actuator 15 fully before contracting top actuator 11 to any degree to initially lift the load. However, depending upon the weight and shape of the load, it may also be desirable at times to contract top cylinder 11 to some degree while bottom cylinder 15 is being extended. The degree to which top cylinder 11 contracts while bottom cylinder 11 contracts while bottom cylinder 15 is being extended to lift the load is controlled by pressure control valve 16. If pressure control valve 16 is fully closed, bottom cylinder 15 contracts to its full extent before any significant contraction takes place in actuator 11. If pressure control valve 16 is not fully closed, top actuator 11 will contract somewhat while bottom cylinder 15 expands. Pressure control valve 16 can then be used to attain the optimum lifting configuration for each load.

After load B has been initially lifted as illustrated in FIG. 2B, it may be desirable to tilt the load backwardly to center the load over wheels 2, 4 for transportation of the load. To accomplish this, the operation of hand pump 13 is continued (if valve 16 were fully closed it must be opened) to contract actuator 11. When rack 6 has been pivoted backwardly so that load B can be safely transported on wheels 2, 4 the operation of hand pump 13 is terminated and the load can readily be moved by the operator by pushing on handles 15. When the load B is at its desired destination, the position of lever 28 is reversed so that top actuator 11 is extended and bottom actuator 15 contracted while hand pump 13 is operated to lower load B to the floor.

It is apparent from above that the present invention allows a single operator to readily lift the heavy load B, transport it as desired and then lower it to the floor. This is accomplished using a simple hand pump, and no motors or other sources of power other than that than the single operator are required.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims:

What is claimed is:

1. A hand truck comprising:
   a pair of laterally disposed front wheels;
   a generally vertically extending rack having a front side and a back side, said rack being pivotably mounted to the front wheels proximate the lower end of said rack so that the rack is pivotable about the axis of the front wheels;
   a generally horizontal load bearing member mounted to the lower end of the rack and extending outwardly from the front side of the said lower end;
   a frame mounted to the front wheels and extending rearwardly with respect to the rack, said frame including a forward portion and a rearward portion movable with respect to one another so that the length of said frame in the rearward direction is adjustable, said frame including wheel means on the underside thereof spaced from the front wheels;
   a bottom actuator spanning the forward and rearward portions of the frame to control the length of said frame;
   a top actuator having one end attached to the rearward portion of the frame and a second end attached to the rack at a position above the lower end of said rack; and
   means for extending the bottom actuator and contracting the top actuator to project the lower end of the rack and the front wheels forwardly and tilt the rack backwardly to lift a load resting on the load bearing member for transportation thereof with the hand cart, and means for contracting the bottom actuator and extending the top actuator to lower the load.

2. A hand truck as recited in claim 1 wherein the bottom and top actuators comprise hydraulic actuators, and wherein the extending and contracting means comprises a hand operated hydraulic pump connected to the bottom and top actuators.

3. A hand truck as recited in claim 1 wherein said extending and contracting means includes means for fully extending the bottom actuator prior to fully contracting said top actuator to facilitate initial lifting of the load.

4. A hand truck as recited in claim 1 wherein said frame includes telescoping members so that the length of the frame in the rearward direction is adjustable.

5. A hand truck comprising:
   a pair of laterally disposed front wheels;
   a generally vertically extending rack having a front side and a back side, said rack being pivotably mounted to the front wheels proximate the lower end of said rack so that the rack is pivotable about the axis of the front wheels;

a generally horizontal load bearing member mounted to the lower end of the rack and extending outwardly from the front side thereof;

a frame mounted to the front wheels and extending rearwardly with respect to the rack, said frame including a forward portion and a rearward portion movable with respect to one another so that the length of said frame in the rearward direction is adjustable, said frame including wheel means on the underside thereof spaced from the front wheels;

a bottom hydraulic actuator spanning the forward and rearward portions of the frame to control the length of said frame;

a top hydraulic actuator having one end attached to the rearward portion of the frame and a second end attached to the rack at a position above the lower end of said rack; and a hand operated hydraulic pump adapted to extend the bottom actuator and thereafter contract the top actuator in sequence to first project the lower end of the rack and the front wheels forwardly while tilting the rack backwardly and thereafter continue to tilt the rack backwardly to lift a load resting on the load bearing member for transportation thereof with the hand truck, said pump being further adapted to contract the bottom actuator and extend the top actuator to lower the load.

6. A hand truck as recited in claim 5 wherein the hydraulic pump includes an output side connected to both the bottom and the top actuator, and means intermediate the hydraulic pump and the top actuator for controlling the flow of hydraulic fluid to the top actuator to extend the bottom actuator to its full length before fully contracting the top actuator.

7. A hand truck comprising:

a pair of laterally disposed front wheels;

a generally vertically extending rack having a front side and a back side, said rack being pivotably mounted to the front wheels proximate the lower end of said rack so that the rack is pivotable about the axis of the front wheels;

a generally horizontal load bearing member mounted to the lower end of the rack and extending outwardly from the front side thereof;

a frame mounted to the front wheels and extending rearwardly with respect to the rack, said frame including a forward portion and a rearward portion movable with respect to one another so that the length of said frame in the rearward direction is adjustable, said frame including wheel means on the underside thereof spaced from the front wheels;

a bottom hydraulic actuator spanning the forward and rearward portions of the frame to control the length of said frame;

a top actuator having one end attached to the rearward portion of the frame and a second end attached to the rack at a position above the lower end of said rack;

a hand operated hydraulic pump having a first side communicated to the extension side of the bottom actuator and the contraction side of the top actuator, and a second side communicated to the contraction side of the bottom actuator and the extension side of the top actuator;

means for designating the output side of the pump and the respective input side thereof so that the pump is operable to extend the bottom actuator and contract the top actuator to lift a load located on the load bearing member, and alternatively to contract the bottom actuator and extend the top actuator to lower the load; and means for controlling the flow of hydraulic fluid to the contraction side of the top actuator relative to the extension side of the bottom actuator during lifting of the load to control the degree to which the lower end of the rack is projected outwardly while tilting the rack backwardly to lift the load.

* * * * *